United States Patent [19]
Geier et al.

[11] 3,860,915
[45] Jan. 14, 1975

[54] MATRIX ARRANGEMENT FOR OPERATING OPTICAL ELEMENTS

[76] Inventors: Karl-Heinz Geier, 2, Strasse der Jargend; Dietmar Schmidt, Block 9; Lothar Uhlmann, Block 37, all of Jena, Germany

[22] Filed: June 29, 1973

[21] Appl. No.: 375,305

[52] U.S. Cl. .......................... 340/173 LS, 307/319
[51] Int. Cl. ..................... G11c 11/36, G11c 11/42
[58] Field of Search ................ 340/173 R, 173 LS; 307/317, 319

Primary Examiner—Terrell W. Fears

[57] ABSTRACT

A matrix comprising optical elements, the optical properties of which being variable through an electromagnetical field applied, said optical elements are connected in series to a first decoupling diode, and in parallel to a second diode, reversely connected to said first one and adapted to remove disturbing currents from said optical elements, being used as storage elements. The matrix may be constructed in semiconductor block techniques.

1 Claim, 3 Drawing Figures

PATENTED JAN 14 1975

3,860,915

INVENTORS

MATRIX ARRANGEMENT FOR OPERATING OPTICAL ELEMENTS

The present invention is concerned with an arrangement for operating optical elements, the optical properties of which are variable by means of an electromagnetic field applied, and each of which is connected in series to a first, decoupling diode and in parallel to a second diode, reversely connected to said first one, for removing disturbing currents from said optical elements, apart from being used as a storage element.

It is known to use storage matrices, in which a liquid crystal material is enclosed between glass sheets, which in turn are crosswise covered by transparent parallel electrode tapes, adapted to operate the liquid crystal material.

Furthermore, it is known to construct storage matrices in sandwiching sheets of glass (laminates) carrying strips of transparent electrodes of tin oxide and liquid crystal material interposed therebetween, which is operated via diodes.

Both arrangements are disadvantageous because the matrices used are bulky, the time of response for the individual elements is too high, and non-activated cells of a matrix are subject to crosstalk interferences.

The latter particularly will happen if a decoupling diode is employed, the considerably high reverse currents of which affect the liquid crystal material.

It is an object of the present invention to provide a matrix, the elements of which are constructed in semiconductor block technique, thus ensuring comparatively small dimensions, and a quick response time.

It is a further object of the present invention to provide a matrix in which the reverse currents of the decoupling diodes do not substantially affect the optical elements used.

Thus the present invention is concerned with an arrangement for operating optical elements, the optical properties of which being variable by means of an electro-magnetical field applied, comprising optical elements used as storing-elements, decoupling diodes, connected in series thereto, wherein a diode, reversely connected to each of said decoupling diodes, is provided parallel to each of said optical elements for removing the critical currents therefrom. Preferably, the two-dimensional matrix arrangement may be constructed in semiconductor block techniques, wherein an n-type epitaxial layer is both applied to a p-type semiconducting layer and divided into areas of different size, insulated from each other by a p-type insulating frame.

The areas of different size incorporate p-type areas, diffused therein, and possessing a non-conductive connection to the insulating frame.

The n-type and p-type areas fully meet switching requirements, and are connected with each other by further conductive layers. The entire surface, except the conductive layer covering the p-type area, is covered by an additional insulating layer, whereupon the optical element is mounted, which in turn is connected to the conductive layer.

Finally the arrangement is furnished with transparent electrodes, secured to a transparent cover plate.

In order that the invention may be more readily understood, reference is made to the accompanying drawings, which illustrate diagrammatically and by way of example two embodiments thereof, and in which:-

Figure 1:
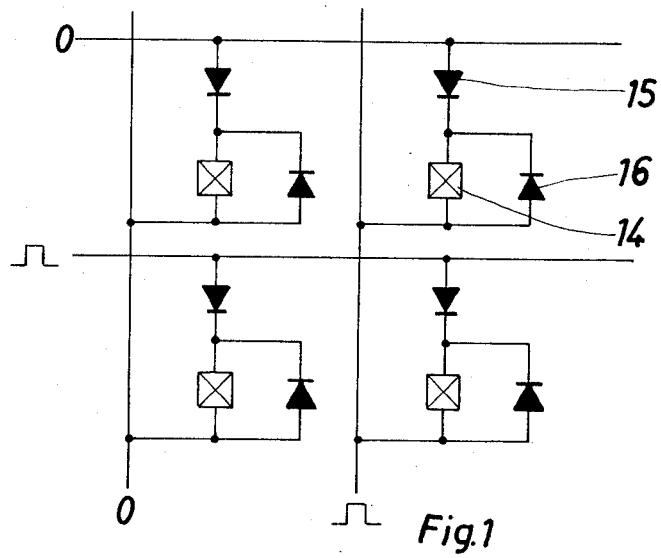
FIG. 1 shows an inventional circuitry in conventional technique.

In FIG. 1 the principle, underlying the inventional arrangement for operating optical elements, is realized in a conventional way.

A section of a matrix arrangement is shown, comprising four optical elements 14, which, in the present case, consist of liquid crystal material or of hot-pressed lanthanum doped lead-zirkonate-titanate-ceramic, a conventionally used decoupling diode 15 and an additional diode 16, which behaves like a storage element and which is reversely connected to diode 15. Due to such a construction, the reverse current is conducted through diode 16, which increases the decoupling effect of diode 15 and keeps the reverse current off the liquid crystal material.

Furthermore, diode 16 may be utilized as a storage element, if the barrier layer capacitance is comparatively high. So a fast response time of the arrangement is obtained and the contrast considerably increased.

Figure 2:
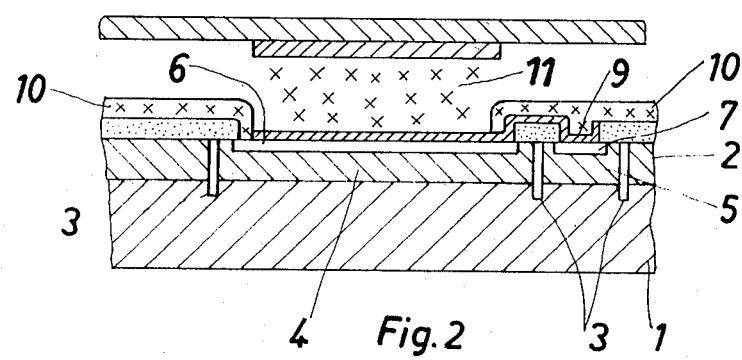
FIGS. 2 and 3 show a two-dimensional matrix in semiconductor block technique.
Figure 3:
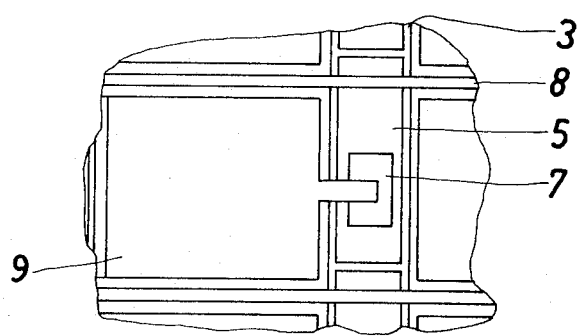

FIG. 2 and 3 represent a semiconductor block technique embodiment of the inventional arrangement.

FIG. 3 is a top view of a matrix constructed in semiconductor block technique. The matrix is adapted to operate optical elements.

Lines 8 connect the n-type epitaxial layers with each other.

A layer 4 is connected to a transparent electrode 12 by an external switching operation, thus the parallel connection of a diode and an optical element 11 is realized.

A disturbing capacitance would develop between layers 4 and 6, which in turn would frustrate the application of semiconductor block techniques, unless the aforementioned parallel connection were established.

The up-build of the matrix is shown in FIG. 2 in cross-section. A p-type semiconductor layer 1 carries an n-type epitaxial layer 2, which is divided into areas insulated from each other by insulating frames 3 of p-type material.

Such insulated layers 4 and 5 are of different size and have p-type domains 6 and 7 diffused therein, which are non-conductively connected to an insulating frame 3. According to the switching requirements, the n-type and p-type areas are connected with each other by additional conductive layers 8, 9.

The entire surface, except the conductive layer 9, is covered by an insulating layer 10, on which the optical element 11 is arranged in contact with the conductive layer 9.

Transparent electrodes 12 are mounted at right angles to the conductive lines embodied by the layer 8, the entire arrangement being secured to a transparent cover plate 13. The electrodes 12 are in connection to the layers 4 in the n-type epitaxial layer.

The optical elements are operated via columns and lines. A selected optical element is activated by a square wave pulse arriving via line 8, whereas the column embodied by layer 4 and electrode 12 in the drawings is at zero-potential.

We claim:

1. "A two-dimensional matrix arrangement for operating optical elements, particularly for use in storages comprising a p-type semiconductor layer, an *n*-type semiconductor layer,
said *n*-type semiconductor layer being an epitaxial layer to said *p*-type semiconductor layer,
a *p*-type junction insulation in a frame like arrangement for matrix formation adapted to divide said *n*-type semiconductor layer into pairs of different sized areas,
each of said pairs being insulated from each other, said different sized areas being diffused in said *n*-type semiconductor layer,
*p*-type areas, diffused in said pairs of different sized areas,
said *p*-type areas having non-electrical connection to said *p*-type insulating frame,
said *p*-type areas, diffused in said pairs of different sized areas forming a pair of different sized diodes,
the pairs of different sized *p*-type areas being connected with each other through a conducting layer,
an insulating layer
for covering the layers and areas mentioned hereinbefore,
with the exception of said *p*-type areas,
an optical element,
the properties of which being variable by an electromagnetical field applied,
a first terminal being formed by said insulating layer and being electrically connected to said optical element
a second terminal,
being electrically connected to said optical element and being transparent,
a plate being transparent and covering the entire matrix arrangement,
and further conducting layers,
being so arranged as to form columns and lines adapted to operate said optical element and for connecting the larger sized diode in parallel to said optical element,
and the smaller sized diode in series to said optical element."

* * * * *